(12) United States Patent
Wang et al.

(10) Patent No.: US 8,786,155 B2
(45) Date of Patent: Jul. 22, 2014

(54) AXIAL GAP ROTATING ELECTRICAL MACHINE

(75) Inventors: Zhuonan Wang, Hitachi (JP); Yuji Enomoto, Hitachi (JP); Motoya Ito, Hitachinaka (JP); Ryoso Masaki, Narashino (JP); Hiromitsu Itabashi, Tottori (JP); Baiying Huang, Shizuoka (JP)

(73) Assignees: Hitachi Appliances, Inc., Tokyo (JP); Hitachi Metals, Ltd., Tokyo (JP); Hitachi Industrial Equipment Systems Co., Ltd., Tokyo (JP)

( * ) Notice: Subject to any disclaimer, the term of this patent is extended or adjusted under 35 U.S.C. 154(b) by 366 days.

(21) Appl. No.: 13/210,468

(22) Filed: Aug. 16, 2011

(65) Prior Publication Data

US 2012/0049685 A1 Mar. 1, 2012

(30) Foreign Application Priority Data

Aug. 27, 2010 (JP) ................................. 2010-190343

(51) Int. Cl.
*H02K 21/24* (2006.01)
*H02K 1/18* (2006.01)
(52) U.S. Cl.
USPC ...................................... 310/156.32; 310/268
(58) Field of Classification Search
USPC ......... 310/156.32, 156.33, 216.079, 216.091, 310/216.097, 268
See application file for complete search history.

(56) References Cited

U.S. PATENT DOCUMENTS

| | | | |
|---|---|---|---|
| 4,187,441 A * | 2/1980 | Oney | 310/112 |
| 5,903,082 A * | 5/1999 | Caamano | 310/216.001 |
| 8,373,326 B2 * | 2/2013 | Enomoto et al. | 310/216.045 |
| 2008/0061649 A1 * | 3/2008 | Kim et al. | 310/156.32 |
| 2010/0225195 A1 * | 9/2010 | Asano et al. | 310/216.067 |

FOREIGN PATENT DOCUMENTS

CN 1357958 7/2002
CN 101267147 9/2008
(Continued)

OTHER PUBLICATIONS

Office Action issued in Chinese Patent Application No. 201110241076.X on Jul. 25, 2013.
(Continued)

*Primary Examiner* — Burton Mullins
(74) *Attorney, Agent, or Firm* — Antonelli, Terry, Stout & Kraus, LLP.

(57) ABSTRACT

When an axial gap rotating electrical machine is assembled, stator cores are accurately positioned and a manufacturing process therefor is simplified. The axial gap rotating electrical machine comprises: a housing frame body having a first space in the cylindrical central part thereof and multiple second spaces located in the circumferential direction which have the same distances from the center; a shaft rotatably provided in the first space in the housing frame body; a core placed in each of the second spaces in the housing frame body and a coil arranged around the core; a rotor yoke fixed on the shaft, extended in the direction of the circumference thereof, and having multiple magnets arranged in circumferential positions confronting the cores; and a case having a hole for the shaft and housing the housing frame body and the rotor yoke.

10 Claims, 11 Drawing Sheets

(56) References Cited

FOREIGN PATENT DOCUMENTS

| CN | 201407130 | | 2/2010 | |
|----|-----------|---|--------|---|
| EP | 0329471 | * | 8/1989 | ............... F16F 9/46 |
| EP | 1536542 | * | 6/2005 | ............... H02K 1/18 |
| JP | 5-316709 | | 11/1993 | |
| JP | 2001-309628 | | 11/2001 | |
| JP | 2005-110372 | | 4/2005 | |
| JP | 2006-94664 | | 4/2006 | |
| JP | 2006-174551 | | 6/2006 | |
| JP | 2007-43864 | | 2/2007 | |
| JP | 2008-35599 | | 2/2008 | |
| JP | 2008-245504 | | 10/2008 | |

OTHER PUBLICATIONS

Office Action issued in Japanese Patent Application No. 2010-190343 on Nov. 26, 2013.

* cited by examiner

AXIAL GAP ROTATING ELECTRICAL MACHINE

CLAIM OF PRIORITY

The present application claims priority from Japanese Patent application serial no. 2010-190343, filed on Aug. 27, 2010, the content of which is hereby incorporatedby reference into this application.

FIELD OF THE INVENTION

The present invention relates to an axial gap rotating electrical machine.

BACKGROUND OF THE INVENTION

In general, axial gap rotating electrical machines are comprised of: a pair of rotor having two circular disks provided on the respective opposite surfaces thereof with permanent magnets and a shaft coupling the circular disks together, located in the centers thereof; a stator made up of multiple cores and coils to which the permanent magnets are opposed with a gap in between; and a pair of bearings rotatably supporting both ends of the shaft and bearing holders holding them.

As an example of axial gap rotating electrical machines in which a rotor and a stator are arranged opposite to each other in the direction of the central axial line thereof, there is that described in Patent Document 1 (JP-A-5-316709).

This axial gap rotating electrical machine is formed as follows: Independent electromagnetic steel plate cores with a coil wound thereon are positioned and arranged in the circumferential direction. They are set in dies with insulating material placed between coils and integrally molded with molding resin or by varnishing to form the stator of the rotating electrical machine. Thereafter, a rotor is installed through two bearings. At the last, they are placed in a housing to fix the stator.

As technologies related to the manufacture of this axial gap rotating electrical machine, there are known those described in Patent Document 2 (JP-A-2006-94664) and Patent Document 3 (JP-A-2008-35599).

In the manufactured axial gap rotating electrical machines having the above configuration, it is necessary to accurately place each component part such as a stator core. If variation is produced in the position or disposition of stator cores, the cogging torque of the axial gap rotating electrical machine will become larger than a calculated value and this will increase vibration and noise.

In the technology in Patent Document 2 (JP-A-2006-94664), to accurately position cores, a positioning jig is used in the manufacturing process and an insulator is provided for insulating stator core and coils. In addition, molding dies are used. As a result, the scale of the manufacturing process step for resin-molding the stator is increased.

In the technology in, for example, Patent Document 3 (JP-A-2008-35599), multiple support members in such a shape that they are split along the inner circumference of a housing are provided in the circumferential direction in place of resin-molding the stator. To hold the support members and stator cores, engaging portions engaged with support portions in the circumferential direction are provided. In addition, recessed portions are provided for engaging the stator cores.

However, the structure disclosed in Patent Document 3 (JP-A-2008-35599) involves a problem associated with joining between the support members and the stator cores. The resin-molded stator reduces the mechanical strength of the joints. As the rotating electrical machine rotates, the joints are influenced by vibration and there is a possibility that a stator core is displaced. In high-speed rotation, especially, a problem of strength is prone to rise. Since the stator cores are provided with a recessed portion, the area opposed to magnets is reduced. Therefore, the flux linkage between the rotor magnets and the stator cores is reduced.

To sum up, the rotating electrical machine structures in the above patent documents involve problems associated with the accurate positioning of stator cores in the assembly of rotating electrical machines and the simplification of a manufacturing process. As a result, these technologies cannot contribute to the enhancement of the performance of rotating electrical machines as finished products.

The present invention has been made to solve the above problems. An object of the present invention is to provide an axial gap rotating electrical machine which can position stator cores accurately and simplify the manufacturing process.

SUMMARY OF THE INVENTION

To achieve the above object, the present invention provides an axial gap rotating electrical machine with following features: a housing frame body having a first space in the cylindrical central part thereof and multiple second spaces located in the circumferential direction which have the same distances from the center; a shaft rotatably provided in the first space in the housing frame body; cores placed in the multiple second spaces in the housing frame body and coils arranged outside of the cores; a rotor yoke fixed on the shaft, extended in the direction of the circumference thereof, and having multiple magnets arranged in circumferential positions confront the cores; and a case having a hole for the shaft and housing the housing frame body and the rotor yoke.

It is desirable that the number of the cores and the coils wound on the cores should be different from the number of the magnets on the rotor yoke.

It is desirable that engaging portions for positioning the cores and the coils wound on the cores should be provided as one parts of the housing frame body which forms the multiple second spaces.

It is desirable that a nonmagnetic intervention member should be provided in an air gap between the cores housed in the housing frame body and the magnets on the rotor yoke arranged opposite to the cores.

It is desirable that each second space should be open on one side and closed on the other side.

It is desirable that the case should cover both sides of the housing frame body in the axial direction and should be formed integrally with the housing frame body in the direction of the circumference of the housing frame body.

It is desirable that the housing frame body should be made of nonmagnetic and nonconductive material.

To achieve the above objects, an axial gap rotating electrical machine of the invention is comprised of: a housing frame body having a first space in the cylindrical central part thereof and multiple second spaces located circumferentially with the equal distance from the center thereof; a shaft rotatably provided in the first space in the housing frame body; cores placed in the multiple second spaces in the housing frame body in the axial direction and coils wound on the cores; two rotor yokes fixed on the shaft, extended in the direction of the circumference thereof, and having multiple magnets arranged in circumferential positions confront the cores; and a case having a hole for the shaft and housing the housing frame body and the rotor yokes. The two rotor yokes are provided on the shaft penetrating the central part of the housing frame body on both sides of the housing frame body.

It is desirable that each second space should be open on one side and closed on the other side. Further, it is desirable that the axial thickness of the closed portion should be thinner than the air gap, located on the open side, between the cores housed in the housing frame body and the magnets arranged on the rotor yoke opposite to the cores.

It is desirable that the case should cover both sides of the housing frame body in the axial direction and should be formed integrally with the housing frame body in the direction of the circumference of the housing frame body.

To achieve the above object, an axial gap rotating electrical machine of the invention is comprised of: a housing frame body having a first space in the cylindrical central part thereof, multiple second spaces located on the circumference at equal distances from the center thereof, and a third space intersecting with the first space and located in the circumferential direction; a shaft rotatably provided in the first space in the housing frame body; cores arranged in the multiple second spaces in the housing frame body in the axial direction and coils wound on the cores; a rotor yoke provided in the third space as is fixed on the shaft and having multiple magnets arranged in circumferential positions confront the cores; and a case having a hole for the shaft and housing the housing frame body and the rotor yoke.

The structure of the axial gap rotating electrical machine of the invention makes it possible to significantly reduce the number of assembly parts and significantly reduce the number of man-hours in assembling a motor. As a result, it is possible to simplify the manufacturing process for the motor and shorten the manufacturing time therefor. The manufacturing cost of the motor can be reduced. At the same time, the assembling accuracy can be enhanced and thus the performance of the motor can be enhanced.

DETAILED DESCRIPTION OF THE PREFERRED EMBODIMENTS

Hereafter, description will be given to embodiments of the invention with reference to the drawings. In the following description, an axial gap motor will be taken as an example of the axial gap rotating electrical machine of the invention. However, the configuration described below can also be utilized as a generator in place of a motor.

(Embodiments)

Figure 2:
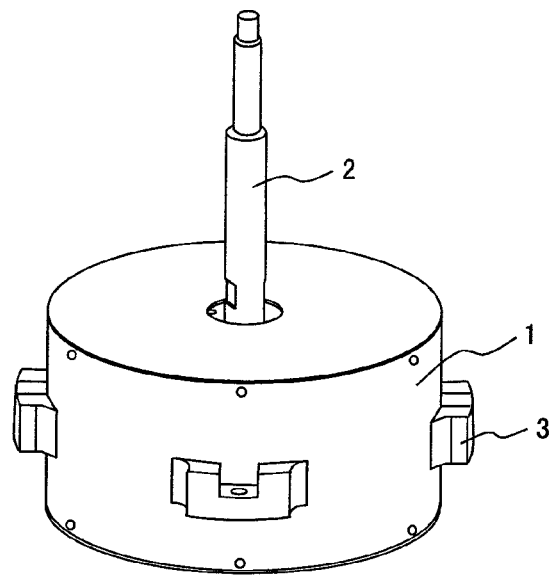
FIG. 2 is a drawing illustrating the appearance and shape of an ordinary axial gap rotating electrical machine.

FIG. 2 illustrates the appearance and shape of an ordinary axial gap rotating electrical machine, which includes a shaft 2 extended upward in the center of a substantially cylindrical rotating electrical machine case 1 formed of nonmagnetic material . The shaft 2 maybe taken out of the rotating electrical machine case 1 on both sides; however, it is taken out only on one side in this example.

The rotating electrical machine case 1 is provided with attaching portions 3 for installing the rotating electrical machine. When the invention is applied to a motor, it is desirable that a nonmagnetic and nonconductive material, such as resin and ceramic, should be used for the case 1 for the prevention of production of eddy current loss. There is no limitation on the material of the attaching portions.

Figure 1:
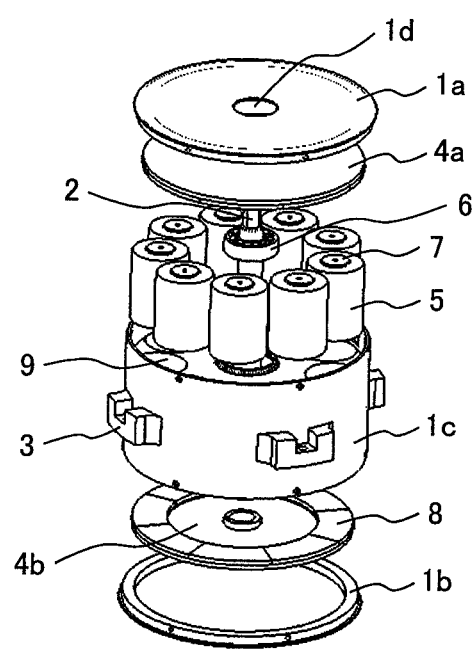
FIG. 1 is a development illustrating the arrangement of devices housed in a rotating electrical machine case.

FIG. 1 is a development illustrating the arrangement of devices housed in the rotating electrical machine case 1. The rotating electrical machine case 1 is comprised of an upper cover 1a, a lower cover 1b, and a side cover 1c and the upper cover 1a is provided with an upper cover shaft hole 1d for inserting the shaft 2. In the space in the rotating electrical machine case 1 comprised of them, an upper rotor yoke 4a, multiple coils 5, and a bottom rotor yoke 4b are housed from above and the shaft 2 is installed in the central part thereof.

Each of the coils 5 has a core 7 at the central part thereof, and magnets 8 are placed on the upper and bottom rotor yokes 4a, 4b in positions where they are opposed to the cores 7 of the coils 5. The upper and bottom rotor yokes 4a, 4b and the shaft 2 integrally fixed together to from a rotor. The coils 5 are installed and fixed in the coil housing holes 9 in the rotating electrical machine case 1 to form a stator. To make it possible to rotate the rotor relative to the stator, the shaft 2 is provided with a bearing 6.

Figure 3:
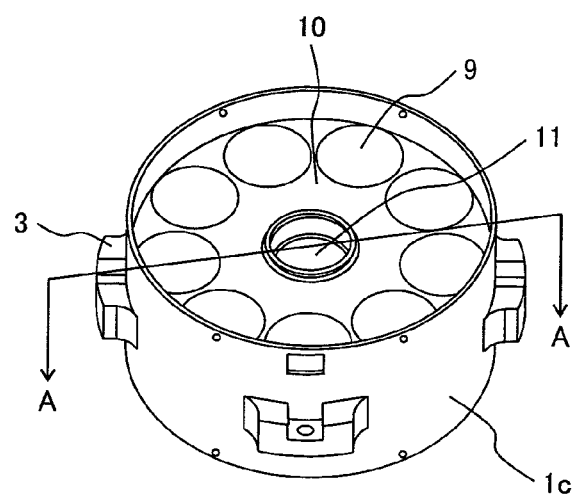
FIG. 3 is a perspective view of a rotating electrical machine case with the housed articles taken out.

FIG. 3 is a perspective view of the rotating electrical machine case 1 with the housed articles (rotor yokes 4, coils 5, shaft 2) taken out and a housing frame body 10 is fixed in the side cover 1c of the rotating electrical machine case 1. The housing frame body 10 has therein multiple coil housing holes 9 for housing and fixing the multiple cylindrical coils 5 and a shaft housing hole 11 for rotatably installing the shaft 2. The coil housing holes 9 are provided at intervals in the direction of the circumference of the housing frame body 10.

A thin wall is provided between the coil housing holes 9 and the coil housing holes as placement spaces are independent of one another.

The housing frame body 10 may be integrated with the side cover 1c of the rotating electrical machine case 1 and the examples illustrated in the following drawings show integrated housing frame bodies. When the invention is applied to a motor, it is desirable that a nonmagnetic and nonconductive material, such as resin and ceramic, should be used for the housing frame body as for the case 1 for the prevention of the production of eddy current loss.

Figure 4A:
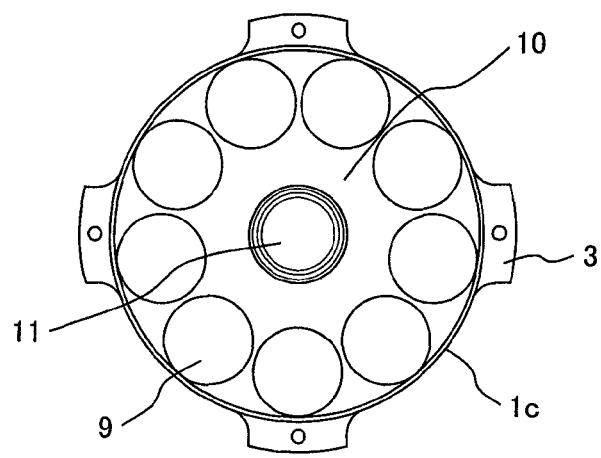
FIG. 4A is a drawing illustrating a rotating electrical machine case and a housing frame body as viewed from above.
Figure 4B:
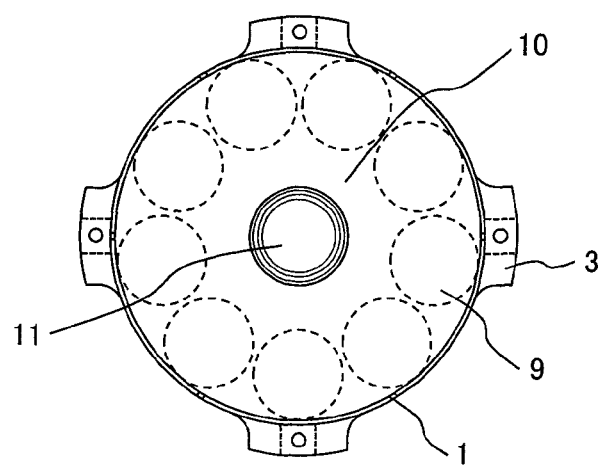
FIG. 4B is a drawing illustrating a rotating electrical machine case and a housing frame body as viewed from below.

FIG. 4A shows the side cover 1c of the rotating electrical machine case 1 and the housing frame body 10 as viewed from above; and FIG. 4B shows the side cover 1c of the rotating electrical machine case 1 and the housing frame body 10 as viewed from below. As is apparent from the comparison of FIG. 4A and FIG. 4B, at the bottom shown in FIG. 4B, the coil housing holes 9 in the housing frame body 10 are closed and only the shaft housing hole 11 is viewable.

Figure 5:
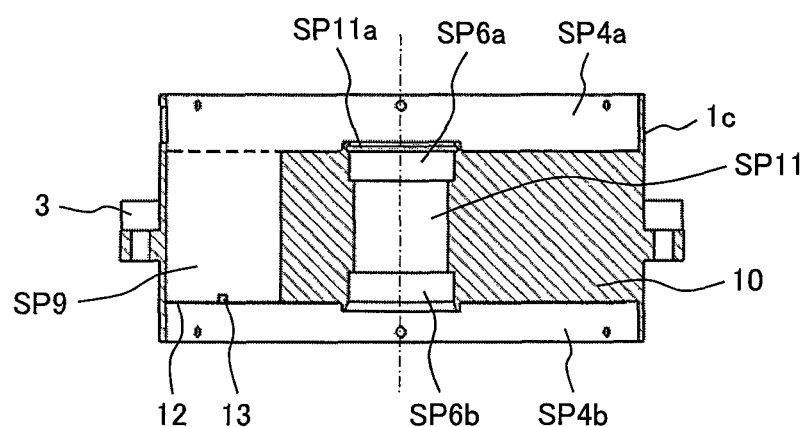
FIG. 5 is a sectional view taken along line A-A of FIG. 3.

FIG. 5 is a sectional view taken along line A-A of FIG. 3. An odd number (nine in the example in the drawing) of coil housing holes 9 are provided in the circumferential direction. Therefore, the drawing shows the section taken along line A-A that runs through a coil housing hole 9 on the left of the shaft housing hole 11 and does not run through a coil housing hole 9 on the right.

In this section, four spaces are roughly formed. They are: a space SP4a located at the upper part defined by the side cover 1c and the housing frame body 10; a space SP4b located at the bottom part defined by the same; a space SP9 corresponding to a coil housing hole 9; and a space SP11 corresponding to the shaft housing hole 11. The upper rotor yoke 4a, the bottom rotor yoke 4b, a coil 5, and the shaft 2 are respectively inserted and placed in these spaces.

In this embodiment, as is apparent form the sectional view in FIG. 5, the spaces SP4 for placing the rotor yokes 4a, 4b are provided at the upper and lower parts. An area (SP9, SP11, and the shaded area) for the housing frame body 10 forming a stator portion is provided between the rotor yoke 4a and the rotor yoke 4b. In the stator portion, each coil housing hole 9 is open on the upper side and each coil housing hole 9 is closed on the lower side. The thickness of the closed portion (bottom portion 12) is smaller than the length of the air gap between the upper rotor yoke 4a and each stator core 7 opposed to each other. More specific description will be given. It is desirable that the sum of the thickness of the closed portion (bottom portion 12) and the gap length from the closed surface to the rotor yoke 4b at the lower part of the section should be equal to the gap length from the stator core 7 to the rotor yoke 4a at the upper part of the section. Therefore, the thickness of the closed portion (bottom portion 12) is reduced.

In actuality, the space SP11 equivalent to the shaft housing hole 11 is provided at the upper part thereof with a space SP11a for placing a retaining ring and at the upper and lower parts thereof with spaces SP6a, SP6b for placing a bearing 6. This example is so structured that a retaining ring is provided for either bearing and when a bearing is press fit, the retaining ring may be eliminated.

Each space SP9 for housing a coil 5 and core 7 is open at the upper part and the bottom portion 12 thereof located on the lower side is closed. In addition, the bottom portion 12 is provided with a protruded portion 13 for engaging and fixing a coil 5 and a core 7 so that it is protruded inward of the space SP9.

Figure 6A:
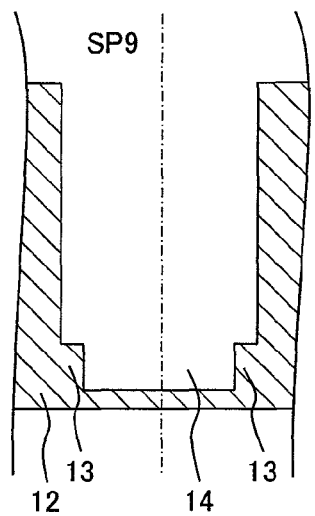
FIG. 6A is a drawing illustrating an example of the shape of a protruded portion for fixing a coil.
Figure 6B:
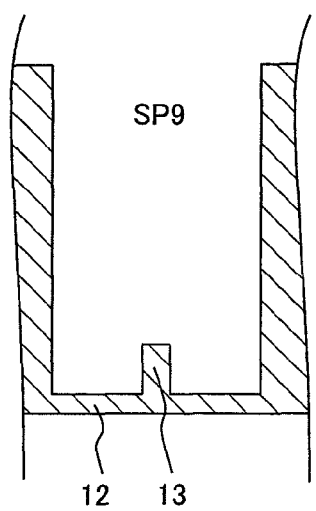
FIG. 6B is a drawing illustrating an example of the shape of a protruded portion for fixing a coil.

FIG. 6A and FIG. 6B illustrate a protruded portion 13 for engaging and fixing a coil 5 and a core 7 and the peripheral shape thereof. In the example in FIG. 6A, a protruded portion 13 is provided on both sides of the bottom portion 12 so that a recess 14 is formed in the center of the bottom portion. In the example in FIG. 6B, a protruded portion 13 is formed in the central part of the bottom portion 12.

Figure 7A:
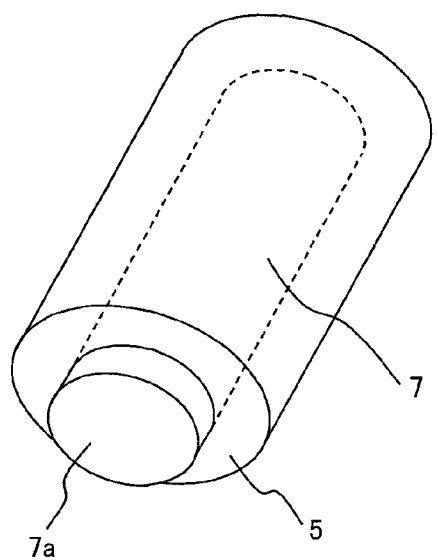
FIG. 7A is a drawing illustrating an example of the shape of the bottom portion of a coil.
Figure 7B:
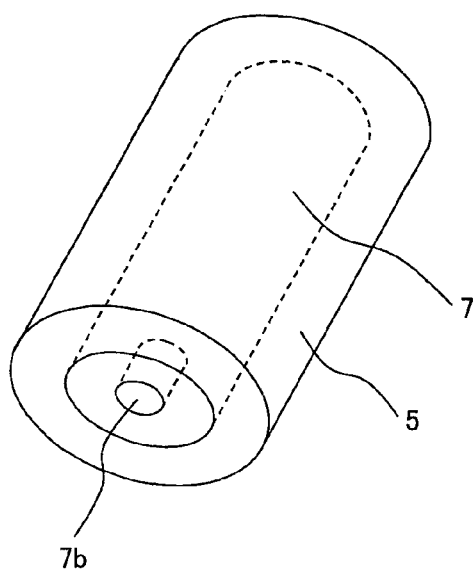
FIG. 7B is a drawing illustrating an example of the shape of the bottom portion of a coil.

FIG. 7A and FIG. 7B illustrate the shapes of the bottom portions of coils 5 and cores 7 so configured that they agree with the shapes of the spaces SP9 in FIG. 6A and FIG. 6B. A coil 5 is wound on the outside of a core 7. The bottom portion of the coil 5 corresponding to FIG. 6A is so formed that the core 7 is slightly longer than the coil 5. The core protruded portion 7a thereof is fit in the recess 14 in FIG. 6A and they are thereby engaged and fixed together.

The bottom portion of the coil 5 corresponding to FIG. 6B has a recess 7b in part of the core 7 as illustrated in FIG. 7B. The protruded portion 13 in FIG. 6B is fit in the recess 7b in FIG. 7B and they are thereby engaged and fixed together. In these drawings, the fit portions are circular; however, it is desirable that they should be formed in a rectangular shape or be positioned off center to position them in the above-mentioned positions.

Figure 8:
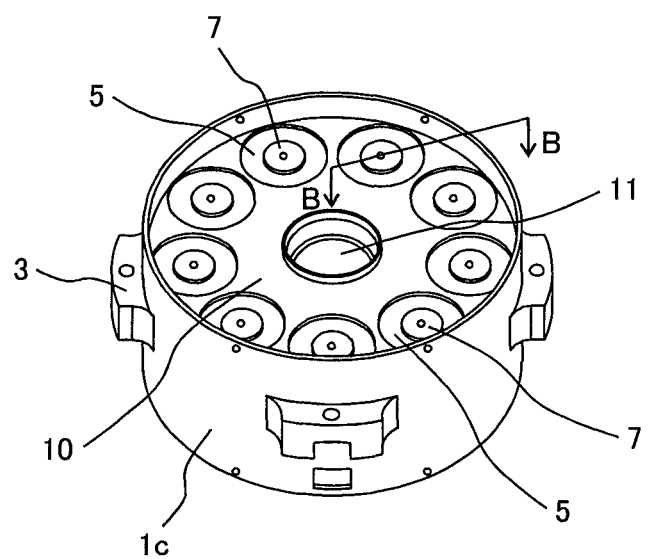
FIG. 8 is a perspective view illustrating how coils are housed in the coil housing holes in FIG. 3.
Figure 9A:
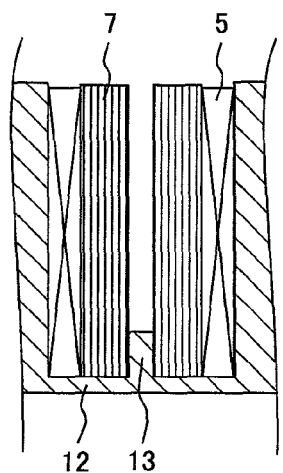
FIG. 9A is a drawing illustrating an example of how a coil is housed in a coil housing hole.
Figure 9B:
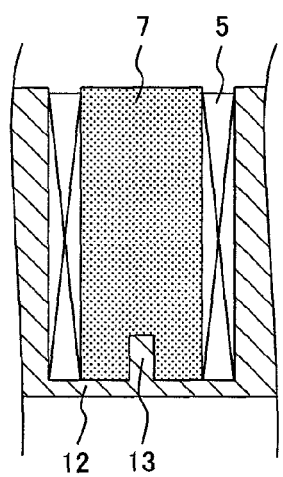
FIG. 9B is a drawing illustrating an example of how a coil is housed in a coil housing hole.
Figure 9C:
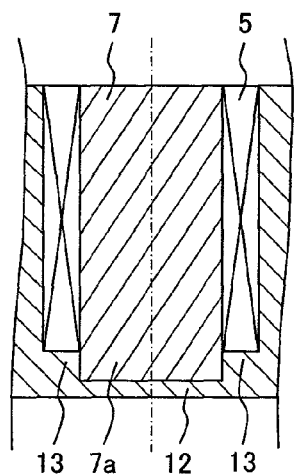
FIG. 9C is a drawing illustrating an example of how a coil is housed in a coil housing hole.

FIG. 8 illustrates how the coils 5 are inserted into the coil housing holes 9 in the perspective view in FIG. 3. FIGS. 9A to 9C illustrate examples of the sections taken along line B-B running through the center of a coil 5 in this drawing.

FIG. 9A illustrates the coil 5 in FIG. 7B as is inserted into the coil housing hole 9 (space SP9) in FIG. 6B. In this case, a wound core formed of magnetic material, such as amorphous metal and an electromagnetic steel plate, can be applied to the core 7. FIG. 9B also illustrates the coil 5 in FIG. 7B as is inserted into the coil housing hole 9 (space SP9) in FIG. 6B. In this case, a dust core formed of powder of magnetic material can be applied to the core 7. FIG. 9C illustrates the coil 5 in FIG. 7A as is inserted into the coil housing hole 9 (space SP9) in FIG. 6A. In this case, the core 7 may be a wound core formed of magnetic material, such as amorphous and an electromagnetic steel plate, or may be a dust core formed of powder of magnetic material.

As mentioned above, a core obtained by winding a thin magnetic ribbon of an electromagnetic steel plate, amorphous, or the like or laminating such thin magnetic ribbons or a core formed of magnetic powder can be applied.

Figure 10A:
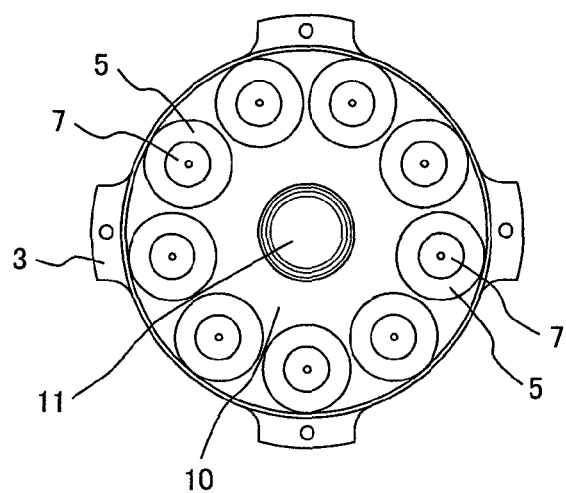
FIG. 10A is a drawing illustrating the coils and the coil housing holes in the perspective view in FIG. 8 as viewed from above.
Figure 10B:
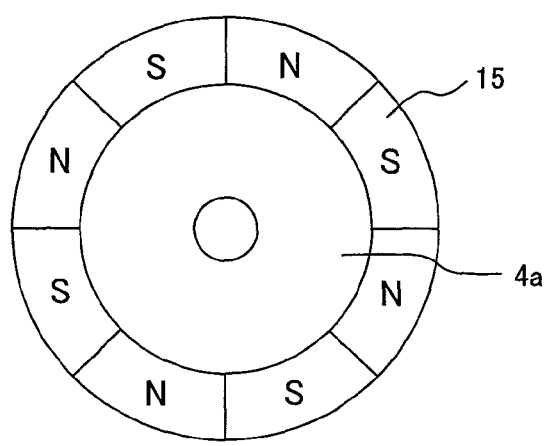
FIG. 10B is a drawing illustrating a surface (the surface on the rotor side) of a rotor yoke.

FIG. 10A illustrates the coils in the coil housing holes in the perspective view in FIG. 8 as viewed from above; and FIG. 10B illustrates the surface (rotor-side surface) of a rotor yoke 4 placed over the surface (stator-side surface) in FIG. 10A with a gap in between. As is apparent from these drawings, the coils 5 of the stator and the magnets 15 of the rotor yoke 4 are both adjacently arranged in the circumferential direction. When mated and opposed to each other, the cores 7 of the coils 5 and the magnets 15 face each other with a gap in between. However, since in axial gap rotating electrical machines, the coils and magnets thereof are so arranged that the number of coils and the number of magnets are different from each other, the following measure is taken in this example: while nine coils (nine slots) are arranged, eight magnets (eight poles) are arranged on the rotor side.

In this description, the upper face in the perspective view in FIG. 8 has been taken as an example. Also with respect to the lower face, magnets 15 are oppositely arranged. This relation at the bottom portion can be considered as follows: the bottom portion surface in FIG. 4B and the face (rotor yoke face) in FIG. 10B are arranged opposite to each other with a gap in between and face each other.

The shape, material, and thickness of the magnets in this embodiment can be arbitrarily set and there is no special limitation thereon. In the example in FIG. 10B, eight fan-shaped, plate-like permanent magnets are arranged in the circumferential direction.

Figure 11:
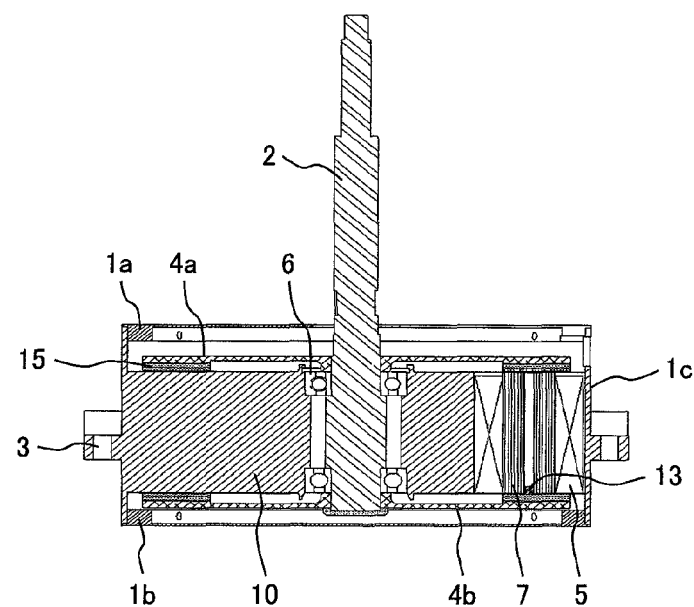
FIG. 11 is a sectional view illustrating a rotating electrical machine including the shaft thereof.

FIG. 11 is a sectional view illustrating an axial gap rotating electrical machine each part of which is configured as mentioned above in the form of a section including the shaft 2. According to this drawing, a rotor portion and a stator are housed in the rotating electrical machine case 1 comprised of the upper cover 1a, lower cover 1b, and side cover 1c. The rotor portion is formed by integrally fixing the upper and lower rotor yokes 4a, 4b and the shaft 2 and is installed through the bearings 6 so that it is rotatable relative to the stator. In the upper and lower rotor yokes 4a, 4b, the multiple magnets 15 are arranged in the circumferential direction so that they face toward the stator.

In the stator, meanwhile, a coil 5 wound on a core 7 is housed in each of the multiple coil housing holes 9 provided in the direction of the circumference of the housing frame body 10. To position each coil when it is housed, a protrusion 13 is provided at the bottom portion of each coil housing hole 9 and each coil 5 is engaged and fixed there. When the cores 7 are housed, they and rotor yoke-side magnets 15 are placed in opposite positions and are so arranged that they face each other with a gap in between.

Various methods can be used in the procedure for the manufacture of this axial gap rotating electrical machine. For example, the following method can be used. A rotating electrical machine case 1 comprised only of the lower cover 1b and the side cover 1c is set on a table and part of the rotor obtained by fixing the lower rotor yoke 4b on the shaft 2 is placed thereon. Further, the housing frame body 10 with the coils 5 housed therein is placed together with the bearings 6 so that the shaft 2 penetrates it. At this stage, the housing frame body 10 is fixed to the side cover 1c. Subsequently, the upper rotor yoke 4a is placed on the housing frame body 10 so that the shaft 2 penetrates it and is fixed together with the shaft 2. Lastly, the upper cover 1a is installed.

Alternatively, the following procedure may be taken. The stator (housing frame body 10) and the side cover 1c are integrally formed and then the rotor yokes 4a, 4b and the upper and lower covers 1a, 1b are installed from above and below.

Figure 12:
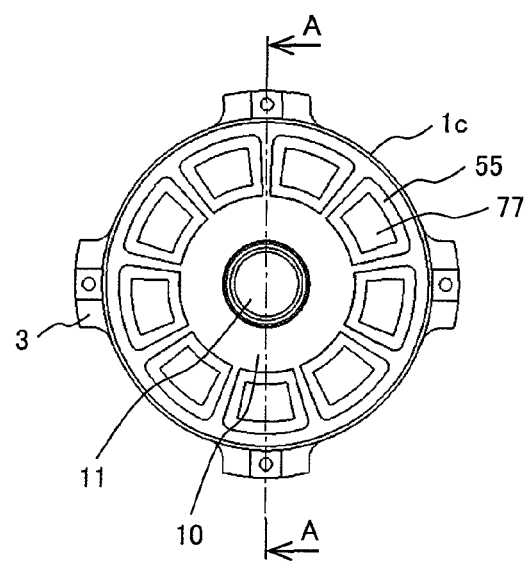
FIG. 12 is a drawing illustrating a housing frame body comprised of substantially fan-shaped cores and substantially fan-shaped coils.

In the above description, a case where each coil housing hole 9 in the housing frame body 10 is circular has been taken as an example. Instead, coil housing holes 9 in such as shape that commonly used substantially fan-shaped cores 77 and substantially fan-shaped coils 55 are housed may be adopted as illustrated in FIG. 12. When this shape is adopted, it is necessary to change the shape of each part. Since this change can be appropriately carried out, however, the description thereof will be omitted here.

Figure 13A:
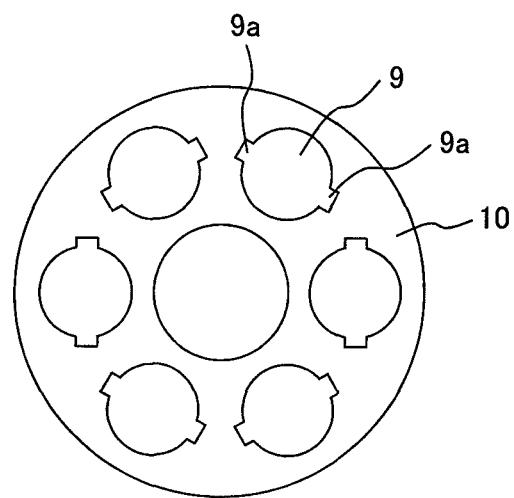
FIG. 13A is a drawing illustrating an example in which engaging portions are provided in a housing frame body.
Figure 13B:
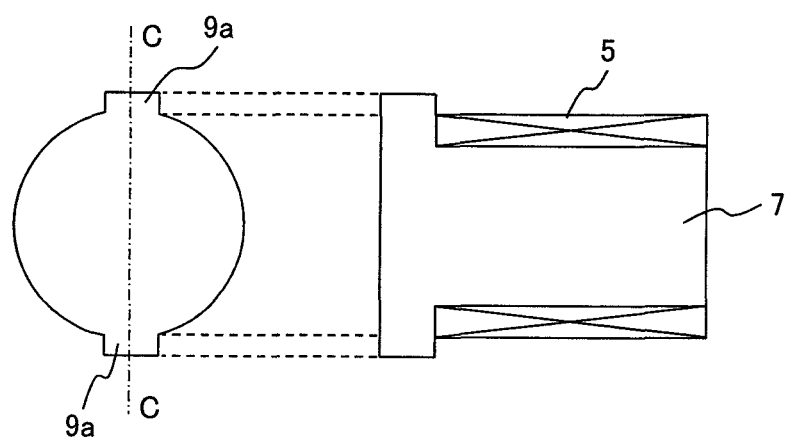
FIG. 13B is a drawing illustrating the shapes of a coil and a core obtained when engaging portions are provided in a housing frame body.

In the above description, a case where the protruded portion 13 is provided at the bottom portion 12 of each coil housing hole 9 for fixing a coil has been taken as an example. Instead, the means illustrated in FIG. 13A may be taken for fixing a coil. That is, each coil housing hole 9 is basically formed in a circular shape and a protruded portion 9a is provided in part thereof. In this case, each coil 5 and each core 7 are configured as illustrated in FIG. 13B. The core 7 is identical in sectional shape with the coil housing hole 9 having a protruded portion 9a. When the section of the core 7 taken along line C-C is viewed in the direction of length, the core 7 is substantially in a T shape. The section of the arm (core head portion) of the T shape is fit in the protruded portions 9a of the coil housing hole 9 and they are thereby engaged and fixed together. The coil 5 is wound on the stem of the T shape. The cores 7 can be physically fixed in the housing frame body 10 by this structure. The protruded portions 9a of each coil housing hole 9 are formed as recesses in the housing frame body 10, needless to add.

In the above description of the embodiment, an eight-pole, nine-slot axial gap rotating electrical machine of two-rotor/one-stator type has been taken as an example. Instead, the invention may be configured as a one-rotor/one-stator-type axial gap rotating electrical machine without installing the lower rotor yoke 4b in FIG. 2. The invention can also be applied to a generator in place of a motor.

When the stator of the rotating electrical machine is precisely positioned, it is desirable to taken the following measure: a cylindrical coil 5 is inserted in position in the placement space of each coil housing hole 9 in the housing frame body 10 positioned beforehand relative to the shaft 2; and thereafter, the cores 7 and the coils 5 are fixed in the holes by fixing material.

As the fixing material used at this time, there is an adhesive fixing material or a physical fixing member. For example, resin adhesive may be placed between the cores, coils, and housing frame body 10 to fix the cores, coils, and housing frame body 10 together. As a member that enables physical fixation, for example, the following measure may be taken: after the cores and the coils are placed, the opening of each coil housing hole 9 is closed with a thin lid. The cores and the coils are thereby fixed in the coil housing holes 9. The cores, coils, and case can be fixed by providing a groove or a protrusion in each coil housing hole 9 in the housing frame body 10. In this case, the fixing member is a nonmagnetic intervention member provided in the air gap between the cores housed in the housing frame body and the magnets of a rotor yoke arranged opposite to the cores.

The following effects can be obtained by the structure of the axial gap rotating electrical machine of the invention described up to this point:

With respect to precise positioning of stator cores, the positions of cores can be accurately determined because the spaces for housing cores and coils are provided beforehand in predetermined positions in the housing frame body.

With respect to the simplification of a manufacturing process, the following required in conventional axial gap rotating electrical machines can be eliminated: a jig for positioning a core and a coil, dies for molding a stator, and a bearing holder. Since the attaching portions are provided on the outer circumferential side of the case, the housing can be eliminated. Since a thin nonmagnetic wall is provided between coils, a member such as an insulator and work associated therewith can be eliminated. Spaces for placing cores and coils (equivalent to the positioning of cores), spaces for placing bearings (equivalent to bearing holders), and attaching portions (equivalent to a housing) can be configured as a single component; therefore, the cost can be significantly reduced.

For the axial gap rotating electrical machine as a finished product, the positions of stator cores can be accurately determined and thus the cogging torque of the motor can be controlled as calculated. The effect of reduction of motor noise is also brought about.

The material of the rotating electrical machine case can be selected from a wide range of materials. This brings about the following effect: a material can be selected according to the requirement (cost priority, insulation priority, strength priority) of the user.

The invention can be applied as an axial gap rotating electrical machine to a wide variety of applications and fields.

What is claimed is:

1. An axial gap rotating electrical machine comprising:
a housing frame body having a first space in the cylindrical central part thereof, and a plurality of second spaces located in the circumferential direction which have the same distances from the center;
a shaft rotatably provided in the first space in the housing frame body;
a core placed in each of the plurality of the second spaces in the housing frame body and a coil arranged around the core;
a rotor yoke fixed on the shaft, extended in the direction of the circumference thereof, and having a plurality of magnets arranged in circumferential positions confront the cores; and
a case having a hole for the shaft and housing the housing frame body and the rotor yoke,
wherein each of the plurality of the second spaces is open on one side and closed on the other side, and the axial thickness of the closed portion is smaller than the air gap between the cores housed in the housing frame body on the open side and the magnets of the rotor yoke arranged opposite to the cores.

2. The axial gap rotating electrical machine according to claim 1,
wherein the numbers of the cores and the coils wound on the cores are different from the number of the magnets on the rotor yoke.

3. The axial gap rotating electrical machine according to claim 1,
wherein an engaging portion for positioning a core and a coil wound on the core is provided as one part of the housing frame body which forms the second spaces.

4. The axial gap rotating electrical machine according to claim 1,
wherein a nonmagnetic intervention member is provided in the air gap between the cores housed in the housing frame body and the magnets of the rotor yoke arranged opposite to the cores.

5. The axial gap rotating electrical machine according to claim 1,
wherein each of the second spaces is open on one side and closed on the other side.

6. The axial gap rotating electrical machine according to claim 1,
wherein the case covers both sides of the housing frame body in the axial direction and is formed integrally with the housing frame body in the direction of the circumference of the housing frame body.

7. The axial gap rotating electrical machine according to claim 1,
wherein the housing frame body is made of a nonmagnetic and nonconductive material.

8. An axial gap rotating electrical machine comprising:
a housing frame body having a first space in the cylindrical central part thereof, and a plurality of second spaces located in circumferential direction with the equal distances from the center thereof;
a shaft rotatably provided in the first space in the housing frame body;
a core placed in each of the plurality of the second spaces in the housing frame body extending in the axial direction and a coil wound on the core;
two rotor yokes fixed on the shaft, extended in the direction of the circumference thereof, and having a plurality of magnets arranged in circumferential positions confront the cores; and
a case having a hole for the shaft and housing the housing frame body and the rotor yokes,
wherein the two rotor yokes are provided on the shaft penetrating the central part of the housing frame body on both sides of the housing frame body,
wherein each of the plurality of the second spaces is open on one side and closed on the other side, and the axial thickness of the closed portion is smaller than the air gap between the cores housed in the housing frame body on the open side and the magnets of the rotor yoke arranged opposite to the cores.

9. The axial gap rotating electrical machine according to claim 8,
wherein the case covers both sides of the housing frame body in the axial direction and is formed integrally with the housing frame body in the direction of the circumference of the housing frame body.

10. An axial gap rotating electrical machine comprising:
a housing frame body having a first space in the cylindrical central part thereof, a plurality of second spaces located on the circumference at equal distances from the center thereof, and a third space intersecting with the first space and extending in the circumferential direction;
a shaft rotatably provided in the first space in the housing frame body;
a core placed in each of the plurality of the second spaces in the housing frame body in the axial direction and a coil arranged around the core;
a rotor yoke fixed on the shaft and provided in the third space and having a plurality of magnets arranged in circumferential positions confronting the cores; and
a case having a hole for the shaft and housing the housing frame body and the rotor yoke,
wherein each of the plurality of the second spaces is open on one side and closed on the other side, and the axial thickness of the closed portion is smaller than the air gap between the cores housed in the housing frame body on the open side and the magnets of the rotor yoke arranged opposite to the cores.

* * * * *